United States Patent [19]

Okazaki

[11] 4,264,654
[45] Apr. 28, 1981

[54] METHOD OF PRODUCING A METALLIC-TONE COATING ON A METAL SUBSTRATE

[76] Inventor: Hajime Okazaki, 14-3, Hibarioka 3-chome, Takarazuka, Hyogo, Japan

[21] Appl. No.: 65,525

[22] Filed: Aug. 10, 1979

Related U.S. Application Data

[63] Continuation-in-part of Ser. No. 927,729, Jul. 24, 1978, abandoned.

[51] Int. Cl.³ .............................................. C04B 31/18
[52] U.S. Cl. .................................. 427/380; 260/42.22; 260/37 M; 428/328; 428/327; 428/407; 106/290; 427/409
[58] Field of Search ................ 106/290, 291; 428/407, 428/328, 329; 260/37 M, 42.22; 427/409, 380

[56] References Cited

U.S. PATENT DOCUMENTS

| | | | |
|---|---|---|---|
| 2,941,894 | 6/1960 | McAdow | 260/37 M |
| 3,764,067 | 10/1973 | Coffey | 427/216 |
| 3,949,139 | 4/1976 | Dunning | 428/328 |
| 3,988,494 | 10/1976 | McAdow | 427/216 |
| 4,116,710 | 9/1978 | Heikel | 106/290 |
| 4,142,018 | 2/1979 | Ozawa | 427/409 |

Primary Examiner—Sam Silverberg
Attorney, Agent, or Firm—Eyre, Mann, Lucas & Just

[57] ABSTRACT

A method of producing a metallic-tone coating on a metal substrate, wherein the main paint contains not greater than 40% by weight of solvent plus metal scales of regular shape and size having no shape corner edges, and wherein the viscosity of the paint is adjusted to 10 sec to 30 sec Ford Cup Test at 25° C.

3 Claims, 6 Drawing Figures

METHOD OF PRODUCING A METALLIC-TONE COATING ON A METAL SUBSTRATE

This application is a continuation-in-part of U.S. application Ser. No. 927,729 filed July 24, 1978, now abandoned.

BACKGROUND OF THE INVENTION

1. Field of the Invention

This invention relates to a method of producing a metallic-tone coating on a metal substrate such as a car body, and more particularly, relates to the application of a paint to a metal substrate for forming a protective and decorative film thereon.

2. Description of the Prior Art

It is known in the art to use a paint containing a clearly-prepared color pigment for the base, and a small proportion of aluminum particles, so as to form a protective and decorative film on a metal substrate, wherein the paint is sprayed by means of a pistol after the substrate is provided with primer coats.

Under the conventional methods, however, the aluminum particles are obtained by pulverization, and their size and shape are unavoidably irregular. This is detrimental to the production of overall fine, metallic brilliancy and tone. In general, the metallic brilliancy and tone are affected by the regularity of the particles contained in the paint. However, no special attention has been paid to the particles to be added, but only to the preparation and/or application of a paint. For a long time, it has been accepted that the preparation and application of a paint essentially requires a high degree of skill and experience to form a desired metallic brilliancy and tone.

SUMMARY OF THE INVENTION

In order to overcome the difficulties mentioned above, the inventor has propsed a new method for which Patent Application Ser. No. 927,729 now abandoned. According to the new propsed method, a paint contains metal scales of regular shape and having no sharp corner edges. In addition, both surfaces of each scale are provided with transparent colored films. When the paint is sprayed on the underlying primer coats, the scales settle down and lie flat thereon. Their relatively wide corner angles prevent the scales from sticking in the primer coats, and additionally, because of the same shape and size, the scales lie side by side without overlapping each other. Thus, a uniform metallic brilliancy and tone are produced. However, because of a punching methods the individual scales have a relatively large size, that is, thick and wide. This is likely to prevent the scales from evenly dispersing in the paint, and accordingly, their effective dispersion calls for control of the amount to be added. When the scales are in excess, it is likely that they overlap from place to place on the primer coats.

Another problem is that when an excessive amount of solvent is added in the paint, the coating surface becomes uneven because of volatilization of the solvent content, and through repeated experiments it has been ascertained that the maximum amount of solvent is 50% by weight. The uneven coating surface makes it difficult to produce an overall metallic brilliancy and tone. Consequently, it is required to flatten the uneven surface by means of an extra remedy process, such as surfacing by abrasion and a further coating. However, such remedies are troublesome and time-consuming: particularly, the scales in the coating are in danger of being damaged by the blades, which also causes a failure of fine metallic tone.

In facing the problems mentioned above, the inventor has noted that it is necessary to reduce the amount of addition of the solvent to 40% by weight or less, on one hand, and, on the other hand, to divide the frequency of application of the paint into at least two shots. In addition, the inventor has discovered that the viscosity of the paint has a relationship with the quality of the coating, and succeeded in reaching a conclusion by conducting the "Ford Cup Test". When the Ford Cup viscosity is 10 sec or less at 25° C., the paint is too fluid, but when 30 sec or more, it is a little viscous. After all, it has been ascertained that the most effective viscosity falls in the range of 10 sec to 30 sec.

Furthermore, the inventor has discovered that when the amount of solvent is reduced to 40% or less, surface tension effectively works in the top layer of the coating, thereby preventing its surface from reducing its surfacial level. It was demonstrated when a coating having 40% of solvent was forcibly dried in about 30 minutes. Even in this case a permissible degree of surfacial reduction occurred, presumably because of the too rapid drying speed for surface tension to work effectively. From this fact, it has been concluded that it is required to allow the coating to dry by itself as well as to control the amount of solvent to 40% at maximum.

Based upon the discovery and experiments mentioned above, the present invention has for its principal object to provide an improved method of producing metallic-tone coating on a substrate. It is also to provide a method of providing a substrate with metallic brilliancy with ease and efficiency. Another object is to provide a method of forming a protective coating on a substrate with the minimum toil.

Other objects and many of the advantages of the present invention will be readily understood from the following detailed description and drawings.

DETAILED DESCRIPTION OF THE INVENTION

Figure 1:
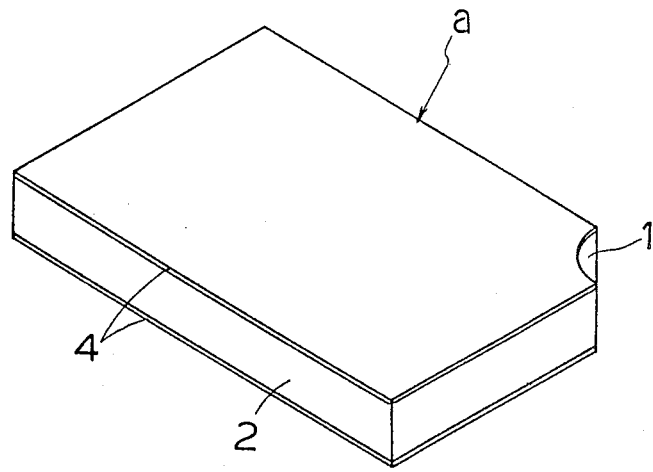
FIG. 1 is a perspective view of a metal scale used in mass for a method of the present invention.
Figure 2:
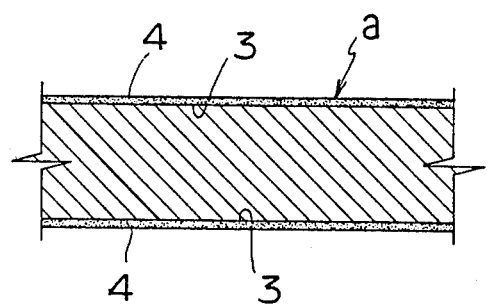
FIG. 2 is a vertical cross-section through the metal scale in FIG. 1.

Referring to FIG. 1, a metal scale a takes a rectangular, flat form, having no sharp corner edges: that is, each corner widens at not smaller than 90°, and 6µ to 60µ thick and 6µ to 3 mm wide. At least one corner 1 is broken. Both surfaces of the scale are mirror-finished, and provided with baked paints 4, wherein the baked paints 4 can be selected from a suitable thermosetting plastics of good optical nature. Preferably, the baked paints 4 are 0.1μ to 3μ thick. The scale a is punched to the same shape and size from a metal sheet, such as an aluminum sheet, after the latter has been mirror-finished and provided with the baked paints 4. The four sides 2 of the scale a have no coating, in which the metal is exposed.

Figure 3:
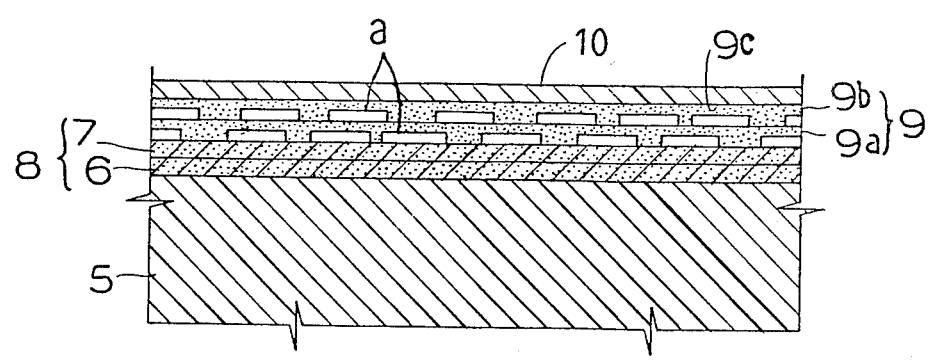
FIG. 3 is a schematic cross-section particularly showing the relationship between the metal scales and primer coats.
Figure 4:
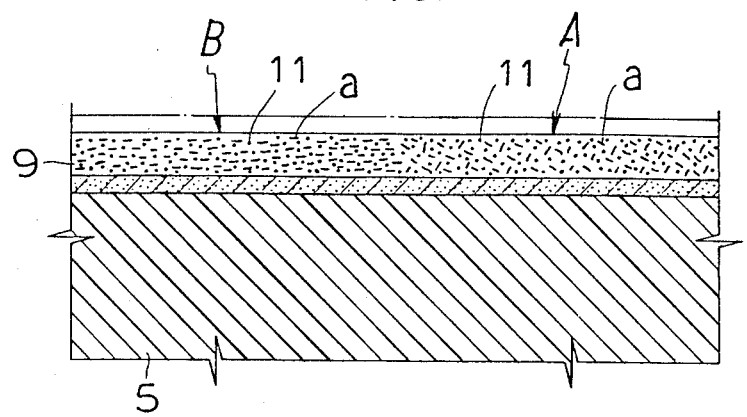
FIG. 4 is a schematic cross-section particularly showing the relationship between particles contained in a top coating and a primer coat under a conventional method.
Figure 5:
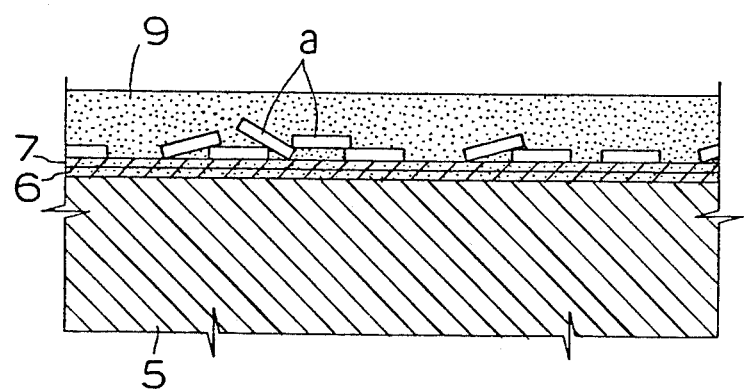
FIG. 5 is a schematic cross-section particularly showing the relationship between metal scales and primer coats under a further conventional method.
Figure 6:
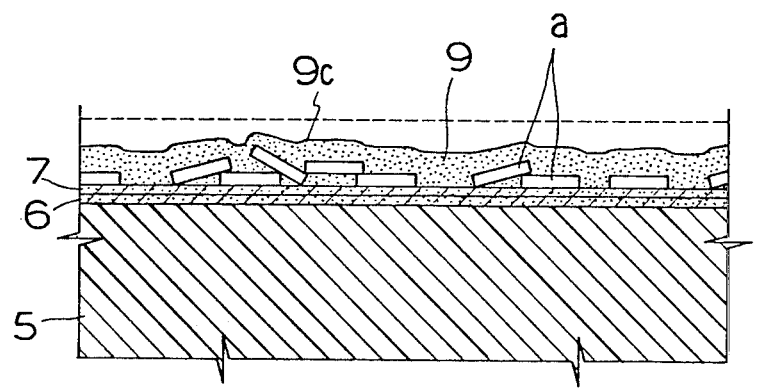
FIG. 6 is a schematic cross-section particularly showing a defective aspect of the conventional method illustrated in FIG. 5.

Now, referring to FIG. 3, a substrate 5 is firstly primed to form a primer coat 6. After the primer coat 6 has dried up, it is coated with the same paints as those applied to the metal scales a, wherein the color is the same therebetween; reference numeral 7 indicating the paints layer, hereinafter referred to as a surfacer 7. The primer coat 6 and the surfacer 7 will be jointly referred to as a base coating 8.

A main paint is prepared, which contains 40% by weight of a solvent and an appropriate amount of metal scales a. In this case its viscosity is adjusted to about 20 sec by Ford Cup Test at 25° C. This main paint is sprayed onto the surfacer 7 by means of a pistol after the surfacer 7 dries up, wherein the main paint is shot at a distance of 30 cm at least twice, at an interval of time sufficient to allow a first layer 9a to dry up. The same period of time is given to a second layer 9b to allow it to dry.

A top coating 10 is formed on the surface 9c of the intermediate layer 9, which top coating is made of an ordinary type of paints containing about 50% by weight of a solvent.

In the intermediate layer 9, the solvent content volatilizes while the metal scales a gradually settle down and finally set horizontal in the layer. The broken corner 1 of each scale serves to allow the solvent vapor to pass through. Advantageously, the non-possession of sharp corner edges prevents the scales a from sticking in the primer coats and from entangling each other. As schematically illustrated in FIG. 3, each scale a becomes horizontal with respect to the primer coat 6. Since the metal scales a are made to the same shape and size, their overlapping can be avoided.

A further advantage of the broken corner 1 is that the intermediate layer 9 and the base coating 8 are securely bonded owing to a chemical bonding action therebetween through the broken corner. In addition, it has been ascertained that both surfaces of the top coating 10 and the intermediate layer 9 maintain flat owing to surface tension working thereupon. As described above, this effect derives from as small a proportion of solvent content as 40% by weight or less, and from a sufficient time for which to allow the solvent to volatilize.

In the aforementioned example, the primer coats 6 and the surfacer 7 are separately formed one after another, but they can be mixed and applied at the same time. This saves the labor and shortens the time for forming the base coating 8. When the substrate 5 is colored, a paint of the same color must be used. The metal scales can be also made of stainless steel, cupper and brass.

In this way, according to the present invention many advantages are obtained, for example:

1. A bright, metallic tone is produced on the surface of a substrate, such as a car body, as if the stars shine in the dark sky;

2. No special technique is required. Under the conventional methods a special skill and experience were called for in applying a paint to a substrate as well as preparing the same, but acording to the present invention a desired metallic tone and feeling can be produced as a natural consequence, without the need for a special skill and experience;

3. No troublesome extra surfacing process is required. A surfacial reduction can be avoided owing to the reduced amount of solvent and the surface tension derived from an adjusted viscosity.

What I claim is:

1. A method of producing a metallic-tone coating on a substrate comprising:
   (a) applying to the substrate a base coating, said base coating including a primer and a surface paint;
   (b) allowing the base coating to dry;
   (c) spray-applying a first layer of metal carrying paint on said base coating, said metal-carrying paint comprising:
      (i) a plurality of metal scales, each said metal scale:
         (A) being substantially of flat, rectangular shape with opposing faces;
         (B) having no corner with an angle of less than 90°;
         (C) being between 6 micron and 60 micron thickness;
         (D) having a layer of baked paint on each of said faces, said baked paint being of the same composition as the surface paint;
         (E) being of substantially the same size and shape as each other said metal scale;
         (F) being without one corner;
      (ii) a paint of the same compsition as the surface paint;
      (iii) up to about 40% by weight solvent;
      (iv) a viscosity in the range of 10 sec to 30 sec Ford Cup Test at 25° C;
   (d) allowing the first layer of metal-carrying paint to dry;
   (e) spray-applying a second layer of said metal-carrying paint;
   (f) allowing the second layer of metal-carrying paint to dry; and
   (g) applying a top coating on said second layer of metal carrying paint.

2. A method as set forth in claim 1, wherein said metal scale is punched from a metal sheet, and wherein said metal sheet has its both surfaces coated with baked thermosetting plastics.

3. A method as set forth in claim 2, wherein said metal sheet is an aluminum sheet.

* * * * *